Feb. 24, 1931. F. H. OWENS 1,793,956
PHOTOGRAPHIC SOUND REPRODUCING APPARATUS
Filed May 28, 1929
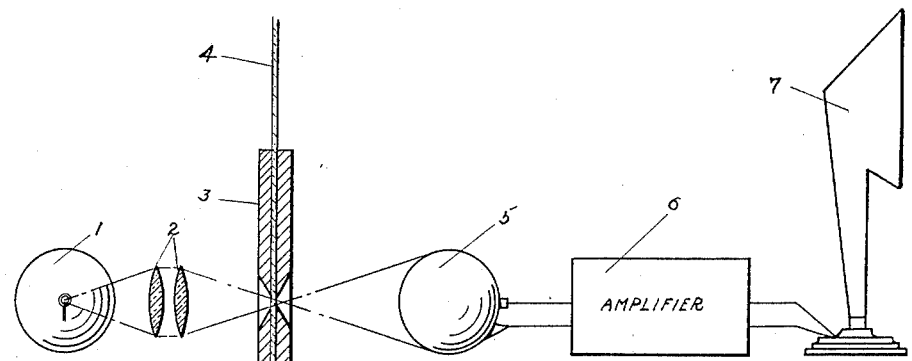
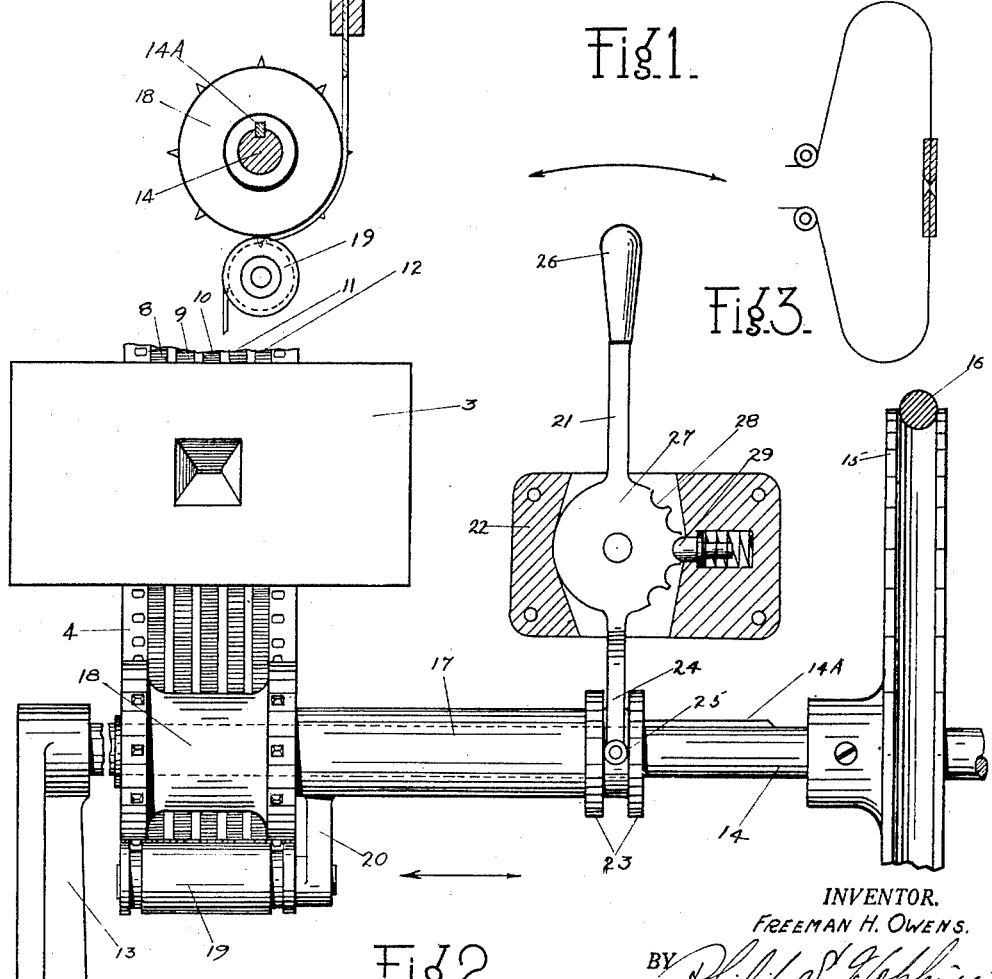
INVENTOR.
FREEMAN H. OWENS.
BY Philip S. Hopkins
ATTORNEY Patented Feb. 24, 1931

1,793,956

UNITED STATES PATENT OFFICE

FREEMAN H. OWENS, OF NEW YORK, N. Y., ASSIGNOR TO OWENS DEVELOPMENT CORPORATION, OF NEW YORK, N. Y., A CORPORATION OF NEW YORK

PHOTOGRAPHIC SOUND-REPRODUCING APPARATUS

Application filed May 28, 1929. Serial No. 366,642.

This invention relates to improvements in photographic sound reproducing apparatus, the principal object of the invention being to provide means for selectively bringing into operative position any one of a plurality of separate sound records carried by a single film.

Other objects and advantages of the invention will appear as the description proceeds.

In the drawing accompanying this specification,

Figure 1 is a diagrammatic, partly sectional view illustrating the essential elements of an apparatus embodying the present invention.

Figure 2 is a partly sectional and broken away side view illustrating in detail the film shifting means forming the subject matter of the invention; and Figure 3 is a diagrammatic view on a reduced scale illustrating the manner in which the film is looped before and after its passage through the gate.

The same characters of reference designate the same parts in the different figures of the drawing.

Referring to the drawing, I have provided a reproducing unit of the well known type, comprising the usual lamp 1, focusing lens 2, gate 3 for supporting a traveling film 4 which moves past a slit in the gate so that light from the lamp will be focused by the lens through said slit and through a sound record carried by the film, the usual light sensitive element or photo electric cell 5 being disposed in the path of the light rays after modulation thereof by passage through the sound record. The output of the photo electric cell is connected with a suitable amplifier 6, which in turn delivers its output to a loud speaker 7 in the usual manner.

As hereinbefore stated, the present invention has to do especially with means whereby a plurality of photographic sound records carried by a single film may be successively brought in to position to be reproduced. To this end the film 4 is shown herein provided with a plurality of sound record tracks 8, 9, 10, 11 and 12 respectively disposed in parallel relation longitudinally of the film and spaced apart transversely of the film. Mounted for rotation in bearings carried by the frame 13 is a shaft 14, to which is secured a driving pulley 15 to which motion is transmitted by a belt 16 from the driving mechanism of the apparatus. Upon the shaft 14 is keyed as at 14a for rotation therewith and for axially sliding movement thereon a sleeve 17 provided at one end with a film sprocket 18 in position to engage the film through its edge openings and move it longitudinally past the sound reproducing apparatus, a presser roller 19 of the usual construction being provided for retaining the film in engagement with the sprocket, said roller being mounted in a bracket 20 formed on the sleeve. For moving the sleeve 17 axially on its shaft a lever 21 is provided, said lever being pivoted approximately midway of its length in a fixed portion 22 of the frame. The sleeve is provided at its free end with spaced flanges 23, and the lever is bifurcated at one end, the bifurcations 24 straddling the sleeve between said flanges. Each bifurcated portion 24 may be provided at its end with a friction reducing roller 25. At its opposite or free end, the lever is provided with a handle 26 for manually swinging the lever on its pivot.

From the foregoing it will be obvious that as the lever 21 is swung back and forth on its pivot, the sleeve 17 will be axially reciprocated on the shaft 14, thus moving the film 4 transversely and the successive sound records into alignment with the slit in the gate 3. For positively retaining the lever in position with any given record in alignment with the slit, the lever is provided with a disk formed portion 27 disposed in concentric relation with its pivot, said portion being provided in its periphery with a plurality of curved depressions 28, corresponding in number with the sound records on the film, each of said depressions being adapted to receive the rounded end of a spring pressed detent pin 29 mounted in the frame 22. The relative location of the pin 29 and depressions 28 is such that when the pin is in engagement with one of said depressions, a corresponding sound record on the film is exactly in alignment with the slit in the gate 3. As indicated in Figure 3, the film is looped for a considerable distance from the points where it enters and emerges from the gate. This looping of the film will permit the film to be moved laterally without buckling or twisting of the film adjacent to the point of light projection through the record.

From the foregoing description, taken in connection with the drawing, it will be seen that I have provided a practical apparatus whereby either of a plurality of separate sound records carried by a single film can be selected for reproduction by merely moving a lever and without removing the film from the machine.

It will be understood, of course, that the individual records carried by the film may be either entirely different records, or each succeeding record may be a continuation of the preceding one. The particular choice of records to be carried by the film is without effect on the spirit and scope of the invention as set forth in the claims hereto appended.

I claim:

1. A photographic sound reproducing apparatus comprising in combination, a photographic sound reproducing unit, a film adapted to travel through said unit and carrying a plurality of sound records, film moving means, driving means therefor, means for selectively shifting said film moving means relative to said driving means thereby to carry either of its records into operative position in the reproducing unit, and means for retaining said shifting means in any of its selected positions.

2. A photographic sound reproducing apparatus, comprising in combination, a sound reproducing unit, a film adapted to travel through said unit and having a plurality of sound records thereon, means for causing traveling movement of the film, fixed driving means therefor, said film moving means being shiftable with respect to said driving means and laterally of the direction of travel of the film, and means for shifting said film moving means thereby to carry either of the sound records into operative position in relation to the reproducing unit.

3. A photographic sound reproducing apparatus comprising in combination, a sound reproducing unit, a film adapted to travel through said unit and having a plurality of sound records thereon, means for causing traveling movement of the film, driving means therefor, said film moving means being shiftable with respect to said driving means and laterally of the direction of travel of the film, and a lever for shifting said film moving means thereby to carry either of the sound records into operative position in relation to the reproducing unit, and means for positively retaining the lever in the selected position.

4. A photographic sound reproducing apparatus comprising a reproducing unit, a film mounted for traveling movement through said unit and having a plurality of sound records thereon, a shaft mounted for rotation adjacent to said reproducing unit, a member mounted on said shaft for rotation therewith and slidable axially thereon, means carried by said member for engaging the film and causing it to travel through said unit, a pivoted lever in engagement with said slidable member for shifting the same axially of the shaft thereby to move the film laterally to carry either of its sound records into operative position in the reproducing unit, said lever having a plurality of angularly disposed notches corresponding in number with the sound records on the film, and a spring pressed detent adapted to engage said notches, the relative disposition of the notches and pin being such as to positively retain the lever against pivotal movement in positions corresponding to the operative positions of the respective sound records in relation to the reproducing unit.

In testimony whereof, I affix my signature.

FREEMAN H. OWENS.